Dec. 17, 1940. J. F. W. KRUSE 2,224,969
SPRING WASHER AND METHOD OF MAKING SAME
Filed Oct. 29, 1938 2 Sheets-Sheet 1
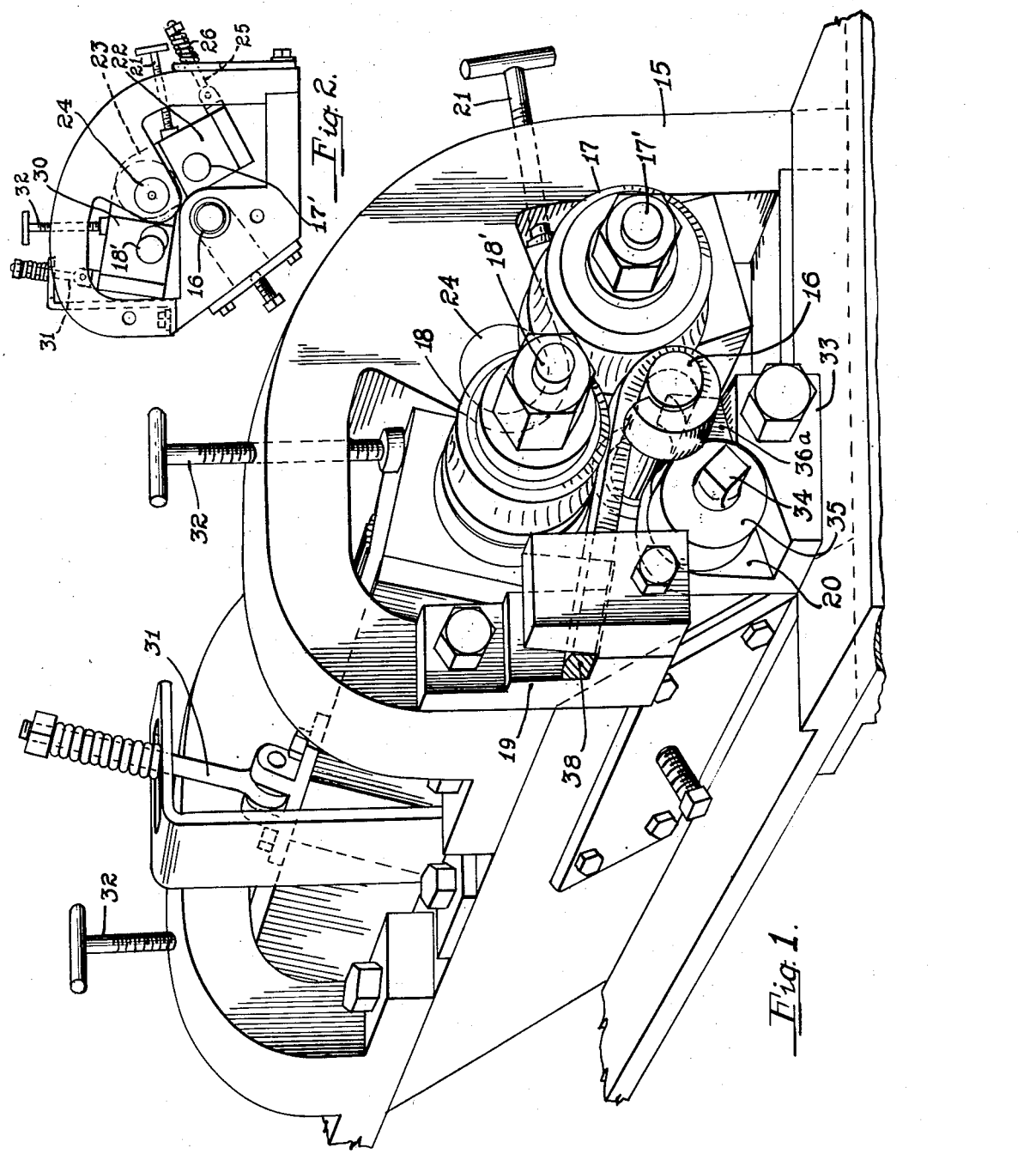
INVENTOR
John F. W. Kruse
By Green & McCallister
His Attorneys Patented Dec. 17, 1940

2,224,969

UNITED STATES PATENT OFFICE 2,224,969

SPRING WASHER AND METHOD OF MAKING SAME

John F. W. Kruse, Oakmont, Pa., assignor to Hubbard and Company, a corporation of Pennsylvania Application October 29, 1938, Serial No. 237,676

6 Claims. (Cl. 10—86)

This invention relates to a new and improved spring washer and method of forming the same.

One of the functions of a spring washer is to compensate for wear, bolt elongation, etc., and thus maintain a definite contact relationship between parts which are bolted together. I employ the term "spring washer" to include spring washers, nut locks, rail joint springs, etc., all of which are spring-like structures and are employed in connection with bolts used on railroad joints, frogs, switches, as well as in other associations where relative movement of the parts bolted together occasions wear and thus tends to decrease the effectiveness of the bolts in securing the parts in the desired relationship.

In railroad work it is the custom to set up the holding nuts forming a part of the rail bolts to such a position that the bolt is subjected to a definite tensile stress, depending, of course, upon the size of the bolt. It is, of course, apparent that under such conditions the bolt occasions a definite holding or clamping force and it is desirable that this force be maintained constant and independently of the conditions of operation encountered. Those familiar with railroad conditions will realize that the passage of every train subjects each rail joint to substantial shocks and that, therefore, the railbolts must be so installed that they are protected from the full force of the shocks so that they will neither be permanently elongated by the shocks nor occasion such wear on associated parts as will cause them to lose their effectiveness. For this reason it has been customary to employ spring washers so located that the spring will yield in response to the shocks and thus prevent undue wear of the parts or permanent distortion (elongation) of the bolts.

It is, therefore, desirable to provide spring washers of such form and so constructed that conditions of use will never be such as to cause the spring washer to lose its spring-like or resilient characteristic. That is to say, the spring washer must be so formed that it will always yield in response to stresses imparted to the associated bolt, under the operating conditions encountered, and in this way in effect limit the maximum strain on the bolt. It is apparent that the conditions here outlined must be accomplished without materially changing the resilient characteristics of the washer and without unduly increasing its size over ordinary spring washers.

An object of my invention is, therefore, to produce a spring washer which is inexpensive, is of convenient or regulation size and which retains its resilient characteristic under greater forces than can be yieldingly resisted by ordinary spring washers of corresponding size.

It will, of course, be apparent that any coil spring loses its resilient characteristics when the force applied to it is sufficient to force the coils thereof together or, in a spring of the single coil type, when the force is sufficient to flatten the coil against the opposed faces normally separated by the spring. Under such conditions, the spring becomes a rigid abutment with the result that it no longer has a limiting effect on the forces transmitted from one associated part to the other.

A further object of this invention is to provide a spring washer in the form of a single coil spring which is so constructed that it will yield readily under normal or ordinary load conditions and is also capable of yieldingly resisting forces of such magnitude as render ordinary spring washers ineffective as springs.

The ordinary spring washer of the single coil type responds readily to the forces encountered under normal operating conditions and while its resistance to yield increases, it increases at a substantially uniform or definite rate until the washer is flattened out and no longer functions as a spring, but as any ordinary solid abutment in transmitting force from one associated part to the other. The spring washer here involved as my invention is so formed that it functions as an ordinary spring washer under normal loads but after a predetermined load is encountered its resistance to distortion increases and, under increasing loads, increases at a greater rate than under normal loads with the result that it continues to yield and thus prevent shock and the detrimental effect occasioned thereby long after it fails to function as an ordinary coil spring.

In the present embodiment, this is accomplished by so forming the spring washer that it is in effect a compound spring, viz., a coil spring and what may be termed a torsion spring. Specifically, the present embodiment involves a bar of spring stock which is, in effect, permanently twisted about its longitudinal axis and is also permanently coiled about an external axis. Under such conditions the washer functions as an ordinary coil spring until flattened to such an extent that a free movement of one coil part with relation to another coil part is no longer possible. At this point, however, the torsional spring functions or continues to function in that the relationship of the force-imparting surfaces to the washer is such as to tend to untwist the bar as increasing forces are applied.

A further object of my invention is to produce a new and improved procedure for manufacturing spring washers, coil springs and similar spring structures.

In the drawings accompanying and forming a part hereof, Figure 1 is a perspective view of a machine for manufacturing spring structures in accordance with the procedure involving my invention;

Fig. 2 is an end view on a reduced scale of the apparatus shown in Fig. 1 with the guide forming rolls and idler removed for the purpose of showing the relative arrangement of operative parts of the machine;

The procedure here involved as my invention consists in twisting bar stock about its longitudinal axis and in coiling it to helical form. The sequence of these steps is immaterial but in the now preferred embodiment of my invention the twisting operation is accomplished simultaneously with the coiling operation.

It will, of course, be apparent that the twisting operation here referred to involves a procedure which permanently distorts the bar stock and in such a way as to cause longitudinal edges of the stock to occupy such positions with relation to the longitudinal axis of the stock that they define a helix around the longitudinal axis of the stock. The longitudinal edges here referred to are edges located between, and formed by, the juncture of flat or plane-like surfaces of the bar stock in its original form, which surfaces are located at angles to each other.

Figure 7:
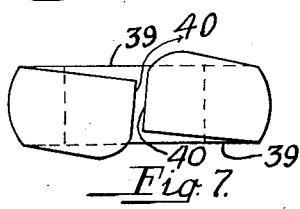
Fig. 7 is a side view of a completed spring washer.
Figure 9:
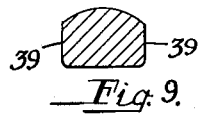
Fig. 9 is a transverse sectional view at a point intermediate the ends of the washer.
Figure 10:
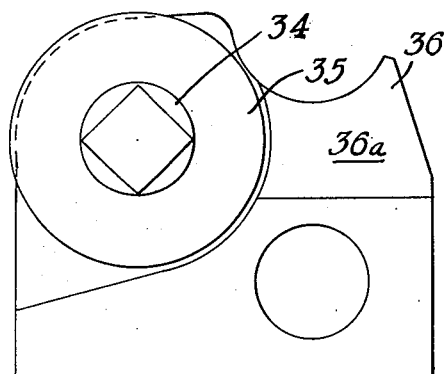
Fig. 10 is a side elevation of a helical forming roll and mounting carriage constituting a part of the machine of Fig. 1.
Figure 11:
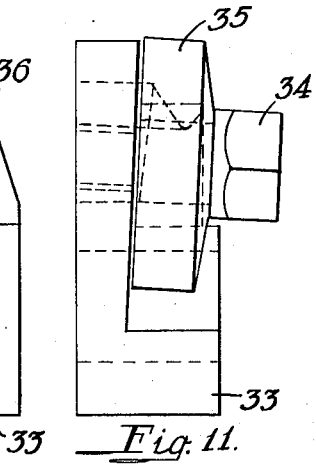
Figs. 11 and 12 are end views.
Figure 12:
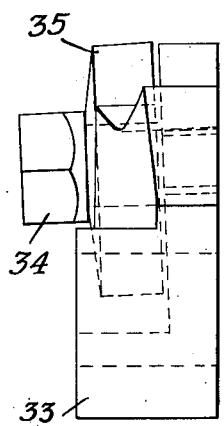
Figure 13:
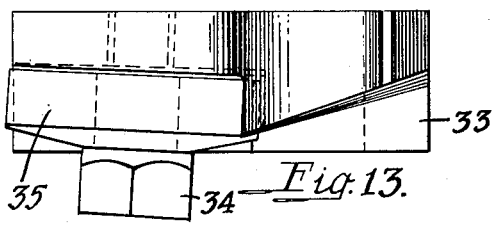
Fig. 13 is a top plan view of the structure shown in Fig. 10.

After the stock is formed into a coil, it is cut into substantially single coil lengths and the ends of each such length are then formed by a grinding operation or otherwise to the desired shape. Each such length is tempered and is then distorted so as to partially flatten it and render it capable of being effectively employed as a spring washer. That is, the spring structure so formed is distorted so that the ends 40—40 thereof are slightly offset as shown in Fig. 7.

In Figs. 1 and 2 I have illustrated a machine for carrying forward a part of the procedure here outlined, i. e., for forming substantially straight bar stock into a coil and in such a way that the stock is subjected to a twisting action about its longitudinal axis during the operation of forming it into a coil. The machine is in many respects similar to an ordinary spring coiler. It includes a frame 15 which provides a support for a coiling arbor 16, a forming roll 17, an idler roll 18, a guide 19, and a helical former 20. The arbor 16 is mounted for rotation in rigid bearings supported by the frame 15, whereas the mounting shaft 17' for the forming roll 17 and the mounting shaft 18' for the idler roll 18 are each mounted in bearings which are movable in the frame 15 in such a way as to adjust the position of each of the rolls 17 and 18 toward and away from the arbor 16.

As shown, the mounting shaft 17' for the forming roll 17 is journaled in a sling 22, which is provided with spaced brackets 23, one of which is disclosed in Fig. 2. Each bracket 23 is provided with an aperture through which a mounting shaft 24 projects, and the sling is, therefore, in effect swung from the shaft. The shaft 24 extends longitudinally of the frame and as shown in Fig. 2, the sling 22 is capable of swinging around the shaft 24 for the purpose of varying the position of the shaft 17' relative to arbor 16.

This movement of the sling is, however, controlled by the cooperation of a link 25 which is restrained by a coil spring 26, and an adjusting screw 21 which is threaded through a suitable aperture in the frame 15 and bears against an appropriate seat formed on the sling 22. The arrangement of the sling 22 and the parts carried by it, i. e., the shaft 17' and the forming roll 17, is substantially similar to the arrangement of corresponding elements in well-known coiling machines and therefore will not be further described. This is also true of the means employed for mounting the idler roller 18 and its carrying shaft 18'. The drawings disclose that the shaft 18' is journaled in a sling 30 which is swung from and is capable of moving around the shaft 24. As shown, the position of the sling 30 is determined by the cooperation between a spring restrained link 31 and two hand screws 32.

The guide 19 is similar to guides employed on well-known forms of coiling machines and is secured to the end of the frame 15 at a point adjacent to the overhanging arbor 16 and the cooperating rolls 17 and 18. It is provided with a slot of such shape and so positioned as to properly guide bar stock between the arbor 16 and the idler roll 18 during the operation of forming a coil.

The forming roll 17 is similar in substantially all of its details to the forming rolls of ordinary coilers and as such is provided with a notch in its peripheral surface which receives the end of bar stock introduced between the arbor 16 and the idler 18 and initially turns the end of the stock around the arbor. The roll 17 and arbor 16 form an active pass which grips and forms the bar stock during the operation of forming a coil. The roll 17 is adjustable toward and from the arbor 16 for the purpose of accommodating different size stock and also for the purpose of insuring the proper gripping and forming action so that each piece of bar stock delivered to the machine will be gripped and fed by the coaction of the arbor 16 and the roll 17 and caused to coil around the arbor. Here again the operation is similar to that of the ordinary coiling machine and need not be stressed except as it bears on the operation of so-called helical former 20, which is secured to the end of the frame 15 at a point immediately adjacent to the overhanging end of the arbor 16.

The helical former 20 is illustrated in detail in Figs. 10 to 13, inclusive, and consists essentially of a carriage 33, a spindle 34 and a roller 35. The roller is mounted for rotation on the spindle 34 which is so mounted on the carriage that its axis is inclined to the axis of the arbor 16. This inclination is in effect in two directions, that is, the spindle 34 is inclined downwardly and also laterally with relation to the axis of the arbor 16.

The end face of the roller 35 is beveled so as to provide a working face in the form of a shallow truncated cone. The carriage 33 is so formed that one portion 36 thereof extends partially around the arbor 16 and also partially around the roller 35, and the outer face 36a of this portion of the carriage is also inclined in two directions with relation to the axis of the arbor and it, in effect, forms a continuation of the beveled face of the roller 35.

In the manufacture of spring washers, such as are here involved, a piece of bar stock 38, after having been heated to the desired temperature, is introduced through the guide 19 between the arbor 16 and the idler roll 18 and so that its forward end abuts against the peripheral face of the driven forming roll 17. The peripheral notch in the forming roll receives the end of the stock and turns it around the arbor 16 and by so doing not only initiates the coiling action but also moves the stock into the active pass so that it is effectively gripped by the arbor 16 and the roll 17. As the end of the stock 38 is thus moved below the arbor 16 it is almost immediately engaged by the face 36a of the carriage 33 and as it moves across that face and around the arbor it is so guided by the face as to twist the bar stock around the longitudinal axis of the stock. During this movement of the stock across the face 36a, it moves onto the beveled face of the roller 35 and the roller continues and completes the tilting or twisting action initiated by the surface 36a. The fact that the roller 35 is free to turn reduces or minimizes the friction between it and the portion of the coil engaging it and thus avoids marring or scoring the surface while insuring a coil of the proper form.

It will be apparent to those skilled in the art that the helical former, here described, not only performs the function of the ordinary deflector plate of the usual spring coiling machine but that it also puts an appreciable twist in the bar stock so that each of its faces, which constitute lateral faces of the spring washer, are actually of helical form. That is to say, the stock advanced by the pass and moving under the arbor is engaged and deflected by the surface 36a and as the coil loop advances it engages or is engaged by the lateral face of the roller 35 which is so positioned that it cooperates with the surface 36a and tilts the loop in the direction of coil propagation along the arbor, thus completing the twisting of the bar stock around its longitudinal axis and producing the helical lateral faces to which reference has been made.

Figure 3:
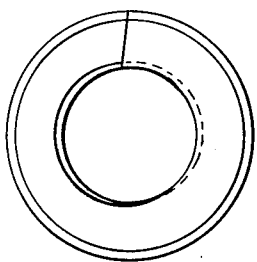
Fig. 3 is an end view of a coil such as is produced by the machine of Fig. 1.
Figure 4:
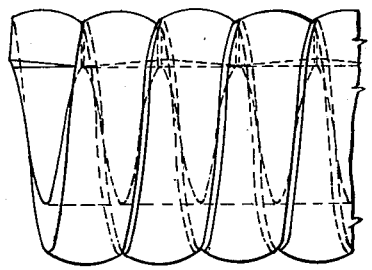
Fig. 4 is a fragmental side elevation of such a coil.
Figure 5:
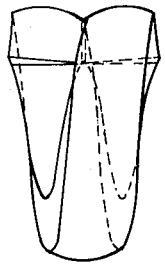
Fig. 5 is a side elevation of a section cut from a coil in the operation of completing a spring washer.
Figure 6:
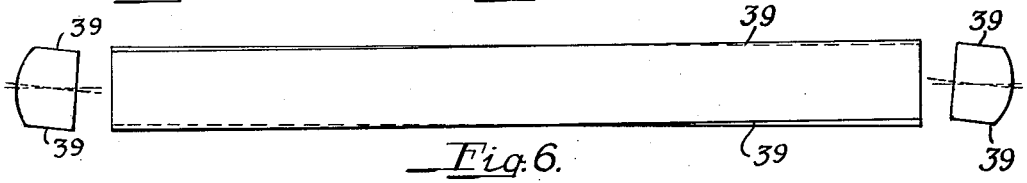
Fig. 6 is a development of the coil of Fig. 5 shown associated with end views of the bar stock for the purpose of visually indicating the twist imparted thereto during the operation of coiling it.
Figure 8:
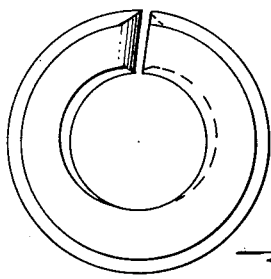
Fig. 8 is an end view of the same.

Figure 6 is a development of the coil section or loop disclosed in Fig. 5, and illustrates the fact that the bar stock is so twisted that each longitudinal edge defines a helix around a longitudinal axis of the bar, and it, therefore, illustrates the further fact that the faces of the bar bounded by these helical edges are helical faces. It, therefore, follows that by employing the helical former and its roller 35, I am able to put an appreciable twist in the stock constituting the formed coil and thus provide each spring washer with opposed lateral faces 39—39 which are substantially parallel helical surfaces and which are helical with relation to the longitudinal axis of the stock and to such an extent that they contribute to the compound spring action heretofore commented upon.

The spring stock 38 is here illustrated as in the form of a bar having opposed faces which are substantially flat and I have herein defined such a structure as rectangular but with no idea of limiting the structure to one which is actually rectangular in cross section. In producing the twist and forming the helical surfaces I so control the various procedural operations that the twist for a spring washer employed, for example, in connection with an inch bolt amounts to approximately 5 degrees or involves a complete turn through a full 360 degrees for about every 18 feet of bar stock. Spring washers embodying my invention exhibit resilient or spring-like characteristics under loads which incapacitate ordinary washers exactly similar in size, weight and quality. For example, an ordinary one inch washer of standard size and quality ceases to exhibit spring-like characteristics for loads in the neighborhood of 20,000 pounds, whereas the same size washers embodying my invention disclose full spring characteristics under loads as high as 36,000 pounds and under conditions which clearly exhibit the compound character of the spring. By this I mean that load and yield tests disclose that spring washers embodying my invention approximate a coil spring in reacting to increasing loads up to approximately 20,000 pounds and then respond to loads substantially in excess of 20,000 pounds in such a way as to exhibit full spring-like characteristics and to indicate that the helical twist imparted to the spring stock provides for sufficient yield to actually limit forces imparted by the spring washer to the torsional strength of the washer.

It will be apparent that while I have disclosed but one procedure for making such spring washers, various changes may be made in the procedure involved without departing from the spirit and scope of the invention and it will also be apparent that while I have illustrated but one spring structure as embodying my invention, the invention is of sufficient scope to include all spring structures so constructed as to provide a combination of torsion and coil spring wherein the torsion spring continues to function after the structure can no longer function as a coil spring.

What I claim is:

1. A method of manufacturing spring washers which consists in heating spring stock to a hot working temperature, subjecting it to coiling and twisting operations, cutting the coil into single coil lengths, tempering each such length and partially flattening each such coil length so that the ends thereof are slightly offset.

2. A method of manufacturing spring washers which includes the steps of simultaneously gripping spring stock and subjecting it to a coiling and twisting operation wherein it is coiled about an external axis to form a succession of coils and is twisted about an internal longitudinal axis of the stock so that the adjacent lateral faces of such coils are helical both with relation to such external axis and said internal axis.

3. A method of manufacturing spring washers which includes the steps of heating bar stock to a hot working temperature, simultaneously gripping such stock with a forming pressure and subjecting it to a coiling and twisting operation wherein it is coiled about an external axis to form a continuous succession of coils, and the lateral faces of such coils are rendered helical both with relation to said external axis and the longitudinal axis of said bar stock, then in cutting such succession of coils into single coil lengths and then in tempering each such length.

4. A spring washer consisting of a single coil of spring stock with the opposed lateral faces thereof of helical form both with relation to the axis of said coil and also with relation to the longitudinal axis of said stock.

5. A spring washer consisting of spring metal stock in the form of substantially a single turn of a helix having a torsional twist about its longitudinal axis from end to end.

6. A spring washer consisting of spring metal stock in the form of substantially a single turn of a helix having a torsional twist about its longitudinal axis from end to end, the ends of such turn being oppositely disposed in close juxtaposition and each having a canted face substantially normal to its respective end.

JOHN F. W. KRUSE.